(Model.)
L. STERN, Dec'd.
R. COHEN, administrator.
DECORATION OF SILVERED GLASS SURFACES AND SIGNS.
No. 305,732. Patented Sept. 23, 1884.
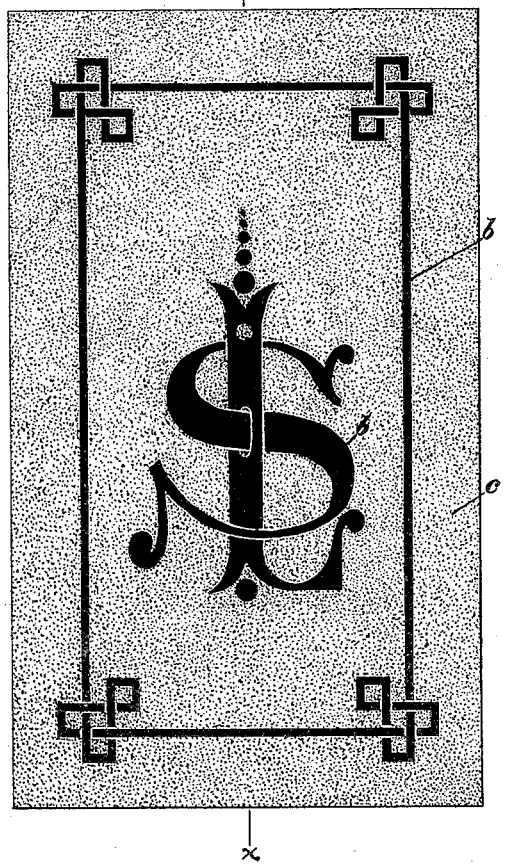
WITNESSES:
INVENTOR:

United States Patent Office.

LOUIS STERN, OF PHILADELPHIA, PENNSYLVANIA; REUBEN COHEN ADMINISTRATOR OF SAID STERN, DECEASED.

DECORATION OF SILVERED GLASS SURFACES AND SIGNS.

SPECIFICATION forming part of Letters Patent No. 305,732, dated September 23, 1884.

Application filed January 4, 1884. (Model.)

*To all whom it may concern:*

Be it known that I, LOUIS STERN, a citizen of the United States, residing at Philadelphia, in the State of Pennsylvania, have invented a new and useful Process to be applied to the Decoration of Silvered Glass Surfaces and Signs, or to any purpose for which such silvered surfaces may be used; and I hereby declare the following to be a full, clear, and exact description of the invention, such as will enable others skilled in the art to which it appertains to make and use the same, reference being had to the accompanying drawings, making part of this specification, in which—

Figure 1 is a face view of a plate of silvered glass decorated or treated in a manner embodying my invention. Fig. 2 is a section thereof in line $x$ $x$, Fig. 1.

Similar letters of reference indicate corresponding parts in the two figures.

My invention consists of etching on the face of silvered glass, for signs and other decorative purposes, to produce a bright letter or letters, ornament or ornaments, on a dull ground, by the use of what is known in the trade as "white acid."

In the drawings, A represents a plate of glass having a backing, $a$, of silver, although other suitable bright metal may be employed. On the face of the plate A is the letter, ornament, or design, as at $b$, and the dull ground $c$, both design and dull ground being on the face.

At the present time all etching for looking-glasses has to be done on the plain glass and then silvered, involving the action of two separate trades—the etcher and the silverer—the latter to be met with only in large cities. The etcher puts on the design. It is then sent to the silverer. Thus are incurred expense, risk of breakage, and loss of time. Now, by this process any one in the trade can get silvered glass of any size by first decorating and then painting the glass with any of the various compositions known to the trade, preference in my process being given to asphaltum, which dries quicker, (say in an hour,) and when dry forms a wall or elevated surface round the edge of the glass, as well as of the design or ornament. Having been thus prepared, the white acid is poured upon the parts unprotected by the asphaltum, and in the course of ten minutes the glass will become dull or crystallized, as at $c$. The acid is then poured from the surface, the glass well washed with cold water, turpentine applied to dissolve the asphaltum covering the letter or ornament, and finally washed with soap and water. The operation is then complete.

I claim—

1. A sign or ornament formed of glass having a silvered back and an etched face, as shown and described.

2. The method of forming a sign or ornament, consisting in marking out on the face of a plate of glass having a silvered back the design, as desired, and then etching the face, excepting the portion occupied by said design, whereby the design appears bright and the ground is dull, substantially as stated.

In testimony whereof I hereby affix my signature in presence of two witnesses.

LOUIS STERN.

Witnesses:
REUBEN COHEN,
BERNARD STRELITSKIE.

It is hereby certified that Letters Patent No. 305,732, granted September 23, 1884, upon the application of Louis Stern, of Philadelphia, Pennsylvania, for an improvement in "Decoration of Silvered Glass Surfaces and Signs," should have been issued to Reuben Cohen, as *executor*, instead of as "administrator," of said Stern, deceased; that the proper corrections have been made in the files and records pertaining to the case in the Patent Office, and should be read in the Letters Patent to make it conform thereto.

Signed, countersigned, and sealed this 21st day of July, A. D. 1885.

[SEAL.]

H. L. MULDROW
*Acting Secretary of the Interior.*

Countersigned:
    M. V. MONTGOMERY,
        *Commissioner of Patents.*